(12) United States Patent
Julian et al.

(10) Patent No.: US 11,623,560 B2
(45) Date of Patent: Apr. 11, 2023

(54) REPLACEABLE VEHICLE LIGHT

(71) Applicants: Danial Julian, Athens, IL (US);
Zhongren Zhang, San Jose, CA (US);
Alek Cappelletti, McCordsville, IN (US)

(72) Inventors: Danial Julian, Athens, IL (US);
Zhongren Zhang, San Jose, CA (US);
Alek Cappelletti, McCordsville, IN (US)

(73) Assignee: XKGLow, Inc., Springfield, IL (US)

( * ) Notice: Subject to any disclaimer, the term of this patent is extended or adjusted under 35 U.S.C. 154(b) by 73 days.

(21) Appl. No.: 17/392,974

(22) Filed: Aug. 3, 2021

(65) Prior Publication Data
US 2023/0043240 A1 Feb. 9, 2023

(51) Int. Cl.
| | | |
|---|---|---|
| *B60Q 1/26* | (2006.01) | |
| *F21V 23/00* | (2015.01) | |
| *F21K 9/238* | (2016.01) | |
| *F21S 43/19* | (2018.01) | |
| *F21Y 115/10* | (2016.01) | |
| *F21V 17/00* | (2006.01) | |
| *F21Y 113/10* | (2016.01) | |

(52) U.S. Cl.
CPC .......... *B60Q 1/2603* (2013.01); *F21K 9/238* (2016.08); *F21S 43/195* (2018.01); *F21V 23/005* (2013.01); *F21V 17/002* (2013.01); *F21Y 2113/10* (2016.08); *F21Y 2115/10* (2016.08)

(58) Field of Classification Search
CPC ...... B60Q 1/2603; F21K 9/238; F21S 43/195; F21V 23/005; F21V 17/002
See application file for complete search history.

(56) References Cited

U.S. PATENT DOCUMENTS

| | | |
|---|---|---|
| 3,574,396 A | 4/1971 | Bird |
| 3,696,334 A | 10/1972 | Demeter |
| 3,788,532 A | 1/1974 | Bish |
| 3,916,377 A | 10/1975 | Demeter |
| 4,011,443 A | 3/1977 | Smith et al. |
| 5,101,326 A | 3/1992 | Roney |
| 5,220,245 A | 6/1993 | Honda et al. |
| 5,384,693 A | 1/1995 | Schwaller et al. |
| 5,406,465 A | 4/1995 | Farchione |
| 5,820,254 A * | 10/1998 | Duenas ............... B60Q 1/0088 362/540 |
| 6,025,775 A | 2/2000 | Erlandson |
| 6,367,949 B1 | 4/2002 | Pederson |
| 6,793,384 B2 | 9/2004 | Ban et al. |

(Continued)

*Primary Examiner* — Arman B Fallahkhair (57) ABSTRACT

The present invention may include a replaceable vehicle light including a lamp body, a printed circuit board (pcb) supported by the lamp body, and the pcb may include a plurality of individual lights arranged in a radial pattern. A controller chip may be included on the pcb, the controller chip may provide electrical energy to each of the individual lights, thereby enabling selective illumination of each of the individual lights. The controller chip may provide a lighting designation, wherein some of the individual lights are designated as primary lights being illuminated at a first brightness, which may illuminate in a radial pattern. The radial pattern may provide a more visible pattern which may be more distinguishable from other roadway lighting, thereby increasing visibility of the replaceable vehicle light.

20 Claims, 7 Drawing Sheets

(56) References Cited

U.S. PATENT DOCUMENTS

| | | |
|---|---|---|
| 6,957,903 B2 | 10/2005 | Arakawa et al. |
| 7,059,754 B2 | 6/2006 | Lekson et al. |
| 7,500,770 B2 * | 3/2009 | Medina ................ B60Q 1/2607 |
| | | 340/479 |
| 7,788,833 B2 * | 9/2010 | Hauck .................... G09F 13/30 |
| | | 362/249.05 |
| 8,992,057 B2 | 3/2015 | Foley et al. |
| 9,322,545 B2 | 4/2016 | Wansor |
| 10,300,973 B2 | 5/2019 | Luttmer |
| 2003/0063472 A1 | 4/2003 | Ban et al. |
| 2009/0134992 A1 * | 5/2009 | Pacheco ................... B62J 6/045 |
| | | 362/108 |
| 2011/0037580 A1 * | 2/2011 | Lin .......................... B62J 6/045 |
| | | 340/432 |
| 2011/0115614 A1 * | 5/2011 | Huang ...................... B62J 6/16 |
| | | 340/432 |

* cited by examiner

REPLACEABLE VEHICLE LIGHT

FIELD OF THE INVENTION

The present invention generally relates to vehicle lighting and, more particularly, to lights used to signal a change in speed or direction on vehicles and especially motorcycles.

BACKGROUND OF THE INVENTION

Vehicle running lights, turn signals and brake lights are common on all modern commercial and passenger vehicles, including motorcycles. These lights are used to alert other motorists as to the intentional reduction in speed, change in direction and even just the physical presence of the vehicle, especially in low light, such as after sundown. The greater the ability of a motorist to know the presence of and intended movement of another vehicle, the lower the risk of an accident due to collision. This is even more important when one of the vehicles is a motorcycle. Motorcycle riders are fully exposed as there is little if any protection between the rider and the large metal object of another vehicle traveling at a high rate of speed on a highway or roadway. In addition, the motorcycle is physically much smaller than a traditional car or truck, with which it shares the roadway. The smaller dimensions of the motorcycle make it inherently less noticeable compared to a four wheeled vehicle. This fact alone may make the need for more noticeable running lights, turn signals and brake lights on a motorcycle even more critical relative to a traditional car or truck.

The level of illumination, or brightness, is a common method of increasing visibility. Using light emitting diodes (LED's) may produce more light energy compared to an incandescent bulb. The limitation is a fully illuminated LED light is still stagnant, in that for example, a solid red light of greater brightness may be more visible than a solid red light of lesser brightness, but it can still tend to blend in with the other solid red lights on the roadway. Flashing lights do offer greater visibility due to the change in brightness that accompanies a "flash". This common flashing may be common in turn signals, so that too may become lost in the sea of other traditional flashing lights due to commonality, and may not provide proper attention to the presence of the vehicle.

It may be shown that a non-uniform, or sequencing and specifically radial sequencing of light provides more visibility and at the same time distinguishes it from other uniform lighting and even sequential linear lighting. Sequential linear lighting may include an arrow on a roadway directing drivers to change lanes due to a lane closure. A radial light may be comprised of a plurality of lights arranged in concentric circles. When the lights are illuminated in patterns based on these concentric circles, the light patterns tend to focus the user on the center of these circles. This may more directly draw the viewer's attention to the center of light pattern and therefore the vehicle. This may be vitally important, especially when the vehicle is smaller, as in the case of a motorcycle. In addition, many motorcycle running lights, brake lights and turn signals are round or oval, therefore a round or oval replacement light may be preferred in that the light may be replaced without the need to change the lamp housing that may be part of the motorcycle body.

It should, therefore, be appreciated that there is a need for a replaceable vehicle lighting system which may provide non-uniform radial light patterns, thus increasing the visibility of light and therefore reducing the likelihood of a vehicular collision. The present invention fulfills this need and others.

SUMMARY OF THE INVENTION

The present invention may include a replaceable vehicle light including a lamp body, a printed circuit board (pcb) supported by the lamp body, and the pcb may include a plurality of individual lights arranged in a radial pattern. A controller chip may be included on the pcb, the controller chip may provide electrical energy to each of the individual lights, thereby enabling selective illumination of each of the individual lights. The controller chip may provide a lighting designation, wherein some of the individual lights are designated as primary lights being illuminated at a first brightness, which may illuminate in a radial pattern. The first brightness may be in a range including 61% to 100% of the maximum brightness of the individual lights. Some of the individual lights may be designated as secondary lights, which may be illuminated less than the first brightness and also the secondary lights output may include zero light output to 60% of the maximum brightness of the individual lights. The designation of secondary lights may be all of the individual lights that are not designated as primary lights. A plug may also be provided to be received by a vehicle lamp housing, the plug being in electrical communication with the pcb.

The replaceable vehicle light may also include a plurality of dynamic lighting patterns encoded on the controller chip, such that each one of the plurality of dynamic lighting patterns may provide a first pattern of illumination of the individual lights in a first radial pattern and then transitioning to a second pattern of illumination of the individual lights in a second radial pattern. Some of the individual lights of the first radial pattern being different from those of the individual lights of the second radial pattern.

The replaceable vehicle light wherein the individual lights are light emitting diodes. The light emitting diodes may be single color LED's or multi-colored LED's. The single-color LED's may include white LED's, amber LED's and red LED's. The replaceable vehicle light may be a light selected from the group consisting of a brake light, a turn signal light and a running light.

The replaceable vehicle light may also include a switch in electrical communication with the pcb. The switch may receive a signal from an outside source to thereby signal the controller chip to progress to a next lighting pattern or lighting pattern category in a series of lighting patterns and lighting pattern categories programmed on the controller chip. The switch may be a magnetic switch mounted on the pcb. The magnetic switch may change the lighting pattern or lighting pattern category based on the duration of time the magnetic switch is in the presence of a magnetic field. The lighting pattern categories may include the categories of running light patterns, turn signal patterns and brake light patterns.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which.

DETAILED DESCRIPTION OF THE INVENTION

With reference to the illustrative drawings and particularly to FIGS. 1-4, there is shown a vehicle 20, in the form of a motorcycle, with replaceable vehicle lights 22 used as front lights 24 which may act as turn signals or running lights and may be positioned in a light housing 28 on the front of the vehicle 20. Rear lights 26, may act as a turn signal, a brake light and/or a running light, which may also be positioned within a lamp housing 28, which may be located on the rear of the vehicle 20. There are some regulations as far as light color and function that are mandated for motor vehicles. For example, lights on the rear of a vehicle must produce a red light or an amber light. Lights on the front of a vehicle may produce light that is white or amber. Running lights may not fluctuate in brightness or pattern unless those lights are acting as a brake light or a turn signal when actuated. It is important to remember that the front lights 24 and the rear lights 26 may each be the same type of vehicle lights 22, in which the lighting outputs and light colors may change as needed by virtue of the lighting mode. For example, a front light 24, operating as a running light, may include a constant white light output during normal operation of the vehicle 20. When the user actuates the turn signal, that same front light 24 may now flash in a pattern or animate between two or more patterns and do so in an amber color. When the turn signal is disengaged, the front light 24 may again illuminate a solid white light output.

In a similar manner, the rear lights 26 positioned in the rear of the vehicle 20 may display a solid (unchanging) red illumination during normal use. When the brakes are applied on the vehicle 20, the rear lights 26 may display a continuous pattern of brighter red light or animate in a sequence of two or more red light patterns. This is explained in more detail below and illustrated in the figures to follow.

Figures 1, 2:
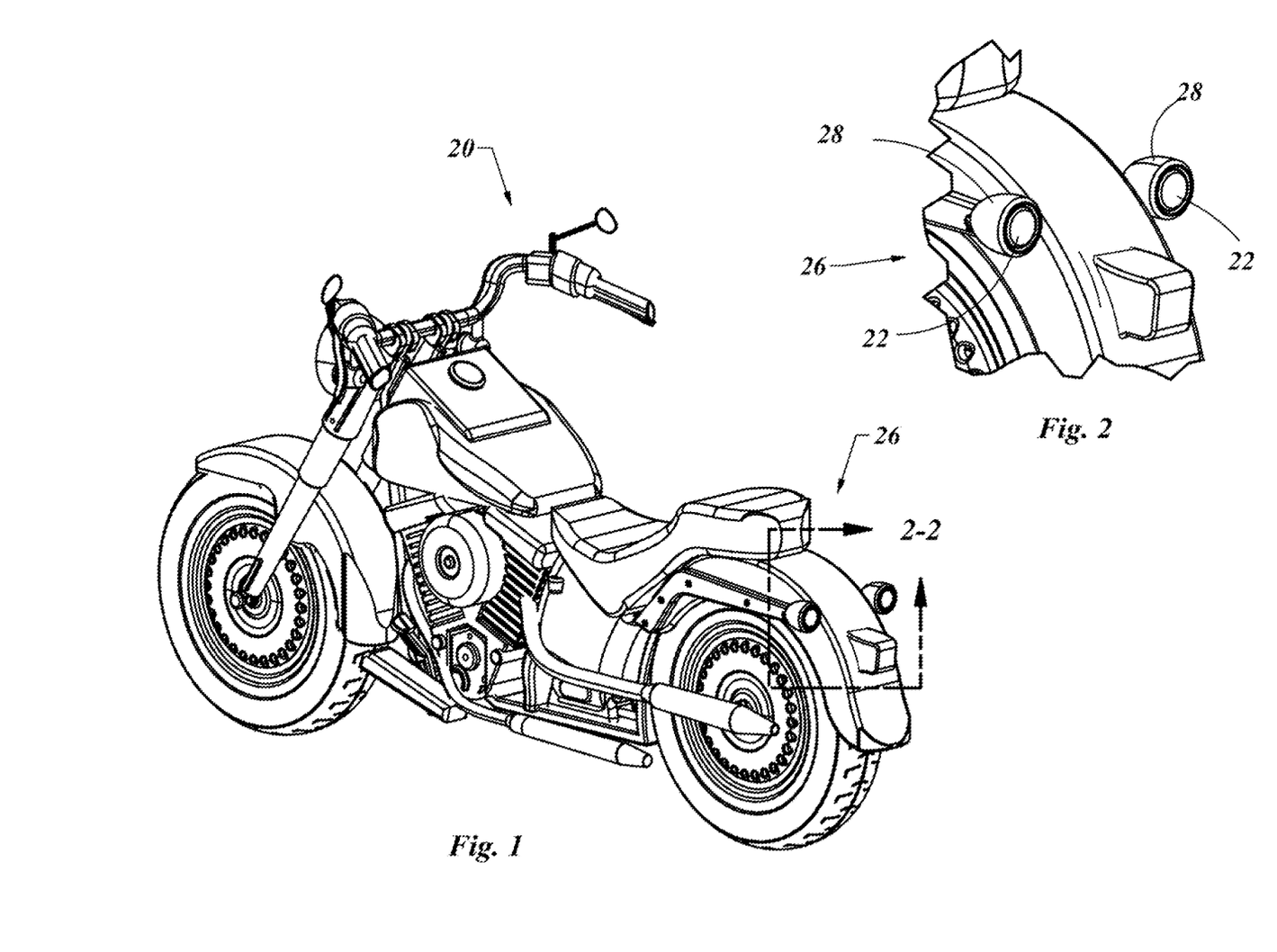
FIG. 1 is a left rear isometric view of a vehicle in the form of a motorcycle with the rear tail lights as replaceable vehicle lights, presented in accordance with the present invention.
FIG. 2 is a partial detail view of the replaceable vehicle lights presented in FIG. 1, cut along line 2-2.
Figures 3, 4:
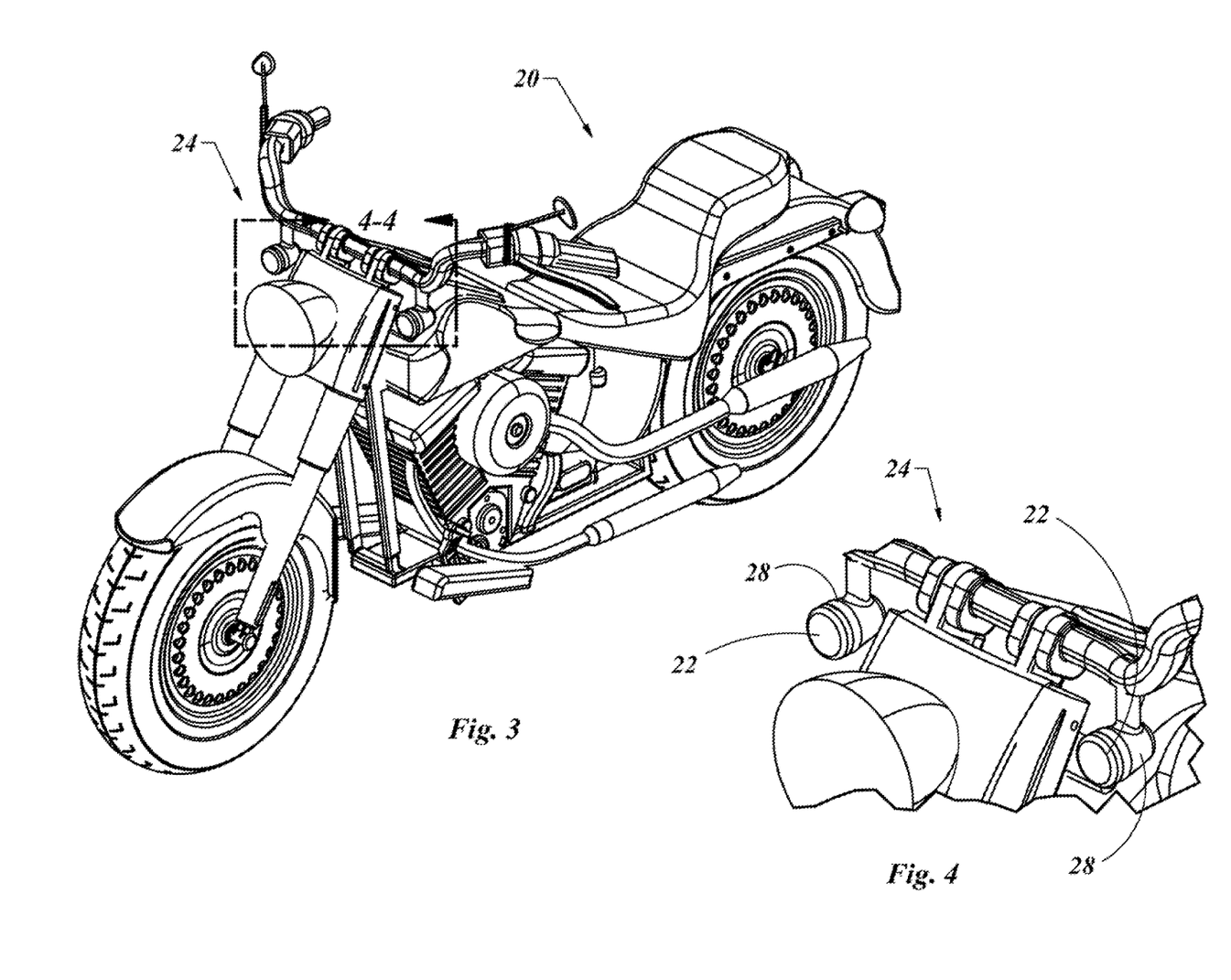
FIG. 3 is a front left isometric view of the vehicle as presented in FIG. 1.
FIG. 4 is an isometric detail view of the front turn signals and running lights as shown in FIG. 3 cut along line 4-4.
Figures 5, 6:
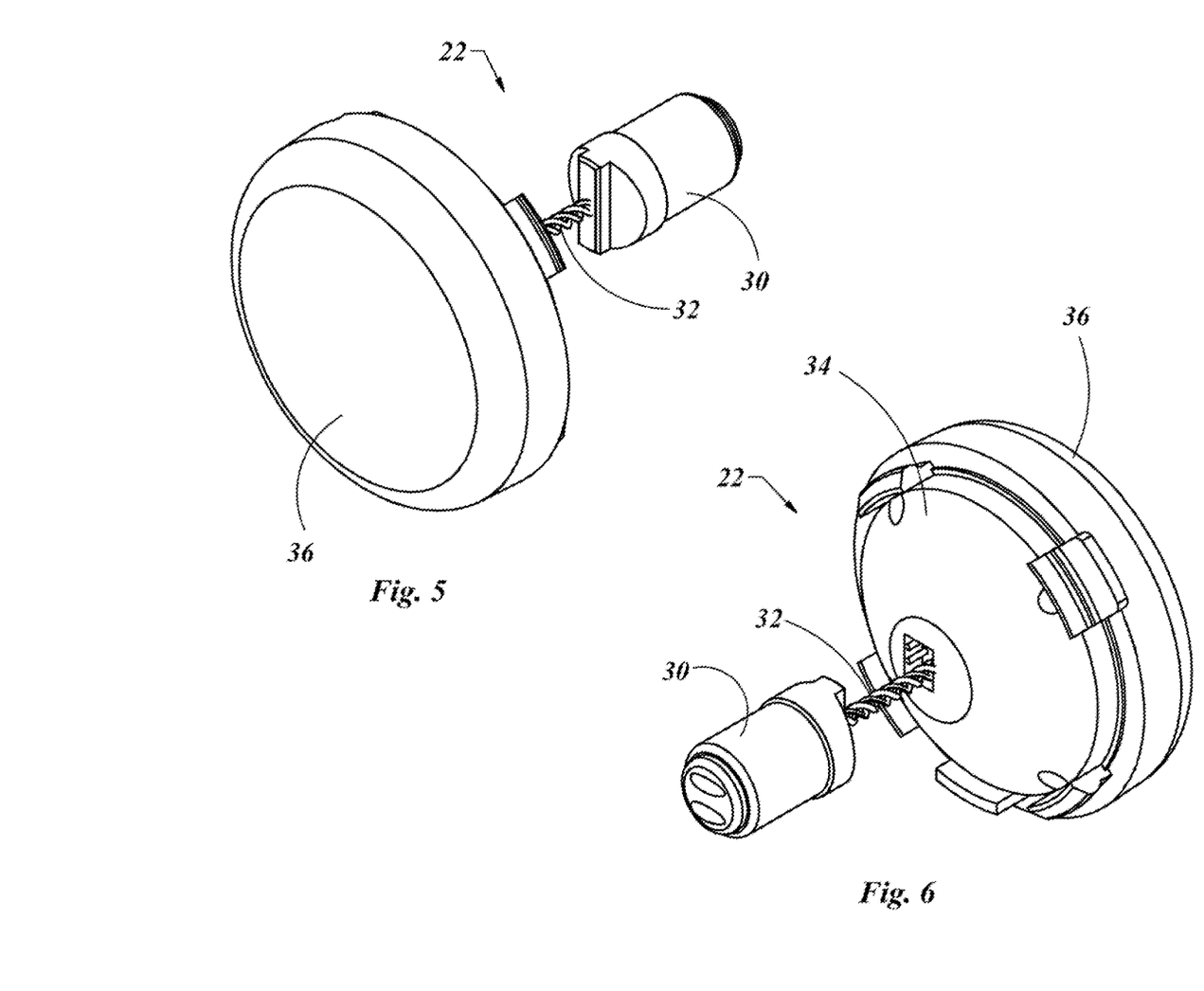
FIG. 5 is a front right isometric view of a replaceable vehicle light as presented in FIG. 1.
FIG. 6 is a left rear isometric view of the replaceable vehicle light as shown in FIG. 5.

With reference to FIG. 5 and FIG. 6, a replaceable vehicle light 22 shown from two different perspectives. In FIG. 5 the replaceable vehicle light 22 is shown from the viewer's perspective as it may be seen when placed in the lamp housing 28, as it may be positioned on the vehicle 20. The replaceable vehicle light 22 may be a replacement for an existing incandescent or LED light used on the vehicle 20. As such, the replaceable vehicle light 22 may be include some of the same physical dimensions of the bulb to be replaced. To replace the light, the old bulb may be removed and the plug 30 may be inserted into a plug cavity within the lamp housing 28 on the vehicle 20. The plug may provide electrical communication between the vehicle 20 and the replaceable vehicle light 22. A wire harness 32 may electrically connect the plug 30 to the lamp body 34. A lens 36 may connect to the lamp body 34. The lens 36 may provide protection to the internal workings of the replaceable vehicle light 22.

Figure 7:
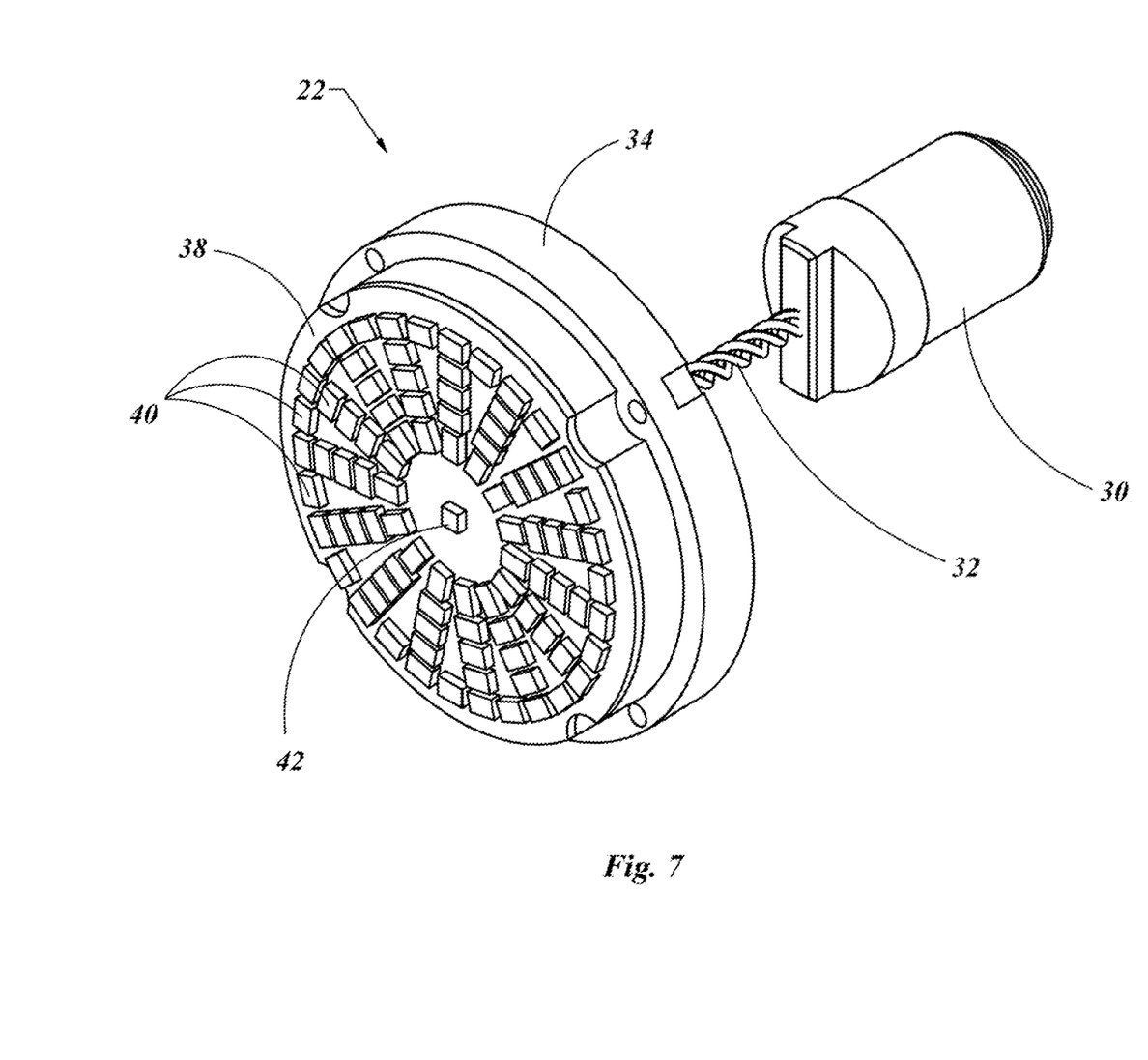
FIG. 7 is a front right isometric view of the replaceable vehicle light as shown in FIG. 5, only here with the front lens removed to show the individual LED's.

The internal workings of the replaceable vehicle light 22 may be shown in FIG. 7, here with the lens 36 removed. The plug 30 may be connected to the lamp body 34 by way of the wire harness 32. Within the lamp body 34 may be positioned a pcb 38 on which a plurality of individual lights 40 may be positioned in a radial orientation. For the purposes of this disclosure, a radial orientation may mean the individual lights 40 may be positioned on the pcb 38 in a pattern consistent with two or more concentric circles. The pcb 38 may also include a controller chip (not shown) that may be incorporated into the pcb 38. The controller chip may regulate the electrical input from the plug 30 to the pcb 38 and ultimately to one or more of the individual lights 40. A switch 42 may also be positioned on the pcb 38. The switch 42 may communicate with the controller chip to change lighting patterns or lighting pattern categories.

The switch 42 may be positioned on the pcb and in electrical communication with the controller chip. The switch 42 may be a mechanical switch or any number of electrical switches. In the preferred embodiment of the invention, the switch 42 may be a magnetic switch. In this case, the switch 42 may act as a push button switch, which when the switch 42 is closed, a current may be sent to the controller chip. The controller chip may recognize this electrical pulse and advance the lighting pattern or the lighting pattern category to the next pattern or category on the list in the memory of the controller chip. The difference between a push button switch and a magnetic switch may be the magnetic switch requires no physical contact to close the switch 42, which sends the signal to the controller chip. The magnetic switch may sense a magnetic field of sufficient field strength and that is all that may be needed to close the switch 42 and send a signal to the controller chip. In this way the switch 42 may be protected from the elements and physical damage by being located behind the lens 36 of the replaceable vehicle light 22 and yet still accessible to be actuated by a magnet in the hand of a user.

Figure 8:
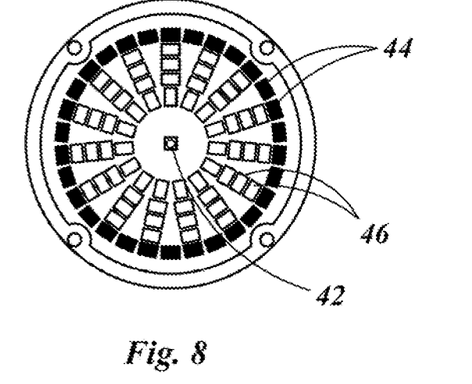
FIG. 8 is a front view of the replaceable light of FIG. 7, shown with a first lighting pattern.
Figure 9:
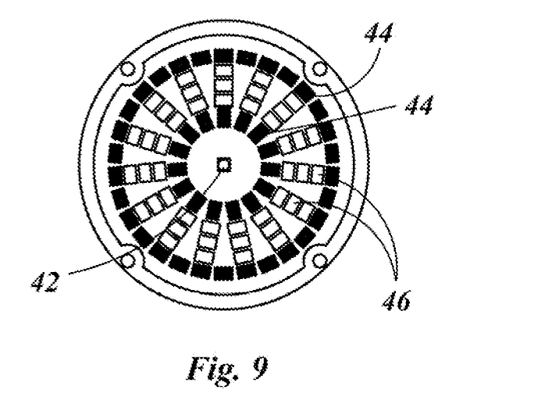
FIG. 9 is a front view of the replaceable light of FIG. 7, shown with a second lighting pattern.
Figure 10:
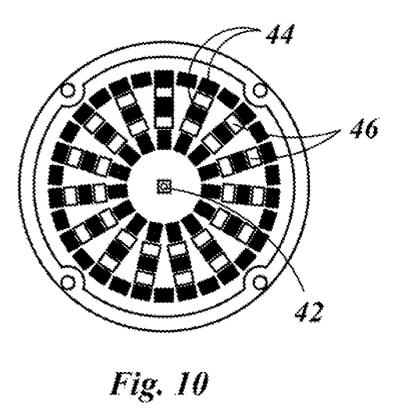
FIG. 10 is a front view of the replaceable light of FIG. 7, shown with a third lighting pattern.

Referring to FIGS. 8-13, examples of different lighting patterns may be provided. Each of these is only an example of a total of an infinite number of possible lighting patterns. In these figures some of the individual lights 40 are shown to be darker. These are designated as primary lights 44. The individual lights 40 that are not primary lights 44 as shown to be lighter or not darkened in. The lights which are not darkened in are designated as secondary lights 46. As is shown, the designation as to which of the individual lights 40 are primary lights 44 and which are secondary lights 46 may change from one lighting pattern to another lighting pattern, as presented in different figures of FIGS. 8-13. The single circle arrangement of primary lights 44, as shown in FIG. 8, may be referred to as a single halo. The two concentric circles of primary lights 44 in FIG. 9 may be referred to as a double halo. The primary lights 44 laid out in in a pattern of three concentric circles in FIG. 10 may be referred to as a triple halo.

Figure 11:
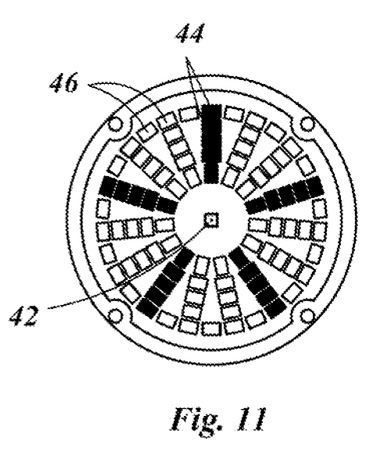
FIG. 11 is a front view of the replaceable light of FIG. 7, shown with a fourth lighting pattern.
Figure 12:
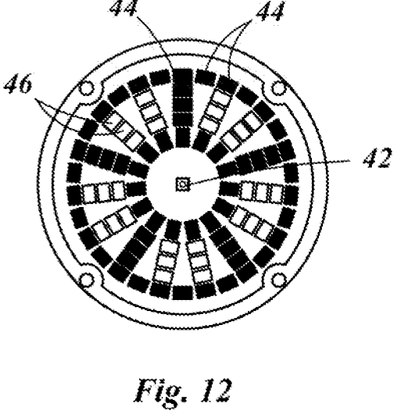
FIG. 12 is a front view of the replaceable light of FIG. 7, shown with a fifth lighting pattern.
Figure 13:
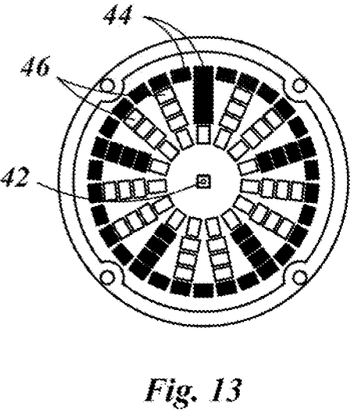
FIG. 13 is a front view of the replaceable light of FIG. 7, shown with a sixth lighting pattern.

Though still arranged in a concentric layout, the pattern of FIG. 11 as presented by the primary lights 44 may be referred to as a simple star, as the primary lights 44 fan out from a common center point. For this embodiment, the center point may be in the area of the switch 42. The star patterns and the halo patterns may be combined as is shown in FIG. 12 to create a double halo star. In FIG. 13, a basic halo and a basic star may be combined to form a halo star.

The primary difference between a primary light 44 and a secondary light 46 may be the level of lighting illumination. A primary light 44 may be illuminated to a greater degree of light output as compared to a secondary light 46. As has been illustrated, the designation of any number of primary lights 44 and secondary lights 46 may differ from one lighting pattern to another. As such, any individual light 40 may be designated as a primary light 44 or secondary light 46 for any lighting pattern and the designation of any individual light 40 may change as needed depending on the desired lighting pattern.

The primary light 44 may be illuminated on a on/off or 100%/0% power to that individual light 40, or some variation in power and therefore light output. If the individual light 40 is an incandescent light, the power input as regulated by the controller chip may vary the light output of the individual light 40 by varying the voltage input to the individual light 40. If the individual light 40 is an LED, the light output may be altered by varying the pulse width of the power to the individual light 40. This process may be called pulse width modulation (pwm). In some cases, pwm may be desired and in other cases, due to the reduced complexity of instructions needed on the controller chip, a simple on/off system may be preferred.

Figure 14A:
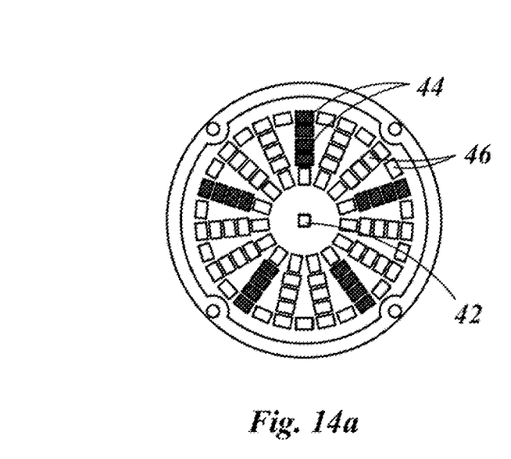
FIG. 14a is a front view of the replaceable light of FIG. 7, shown in a first position of a first dynamic lighting pattern.
Figure 14B:
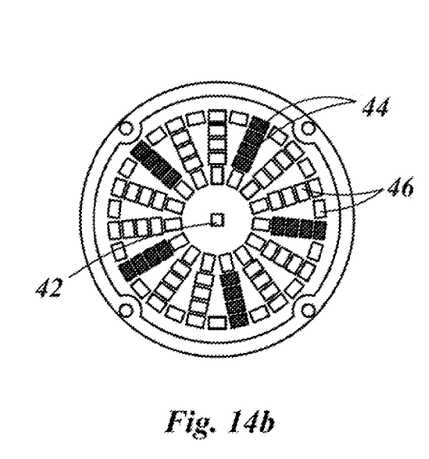
FIG. 14b is a front view of the replaceable light of FIG. 14a, shown in a second position of a first dynamic lighting pattern.
Figure 14C:
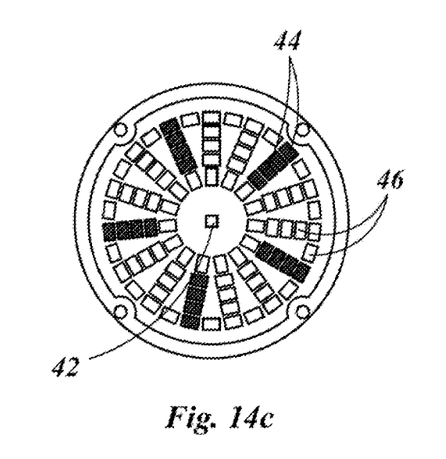
FIG. 14c is a front view of the replaceable light of FIG. 14a, shown in a third position of a first dynamic lighting pattern.

Lighting patterns may also be animated, meaning one lighting pattern may be displayed by a first set of primary lights 44 being illuminated and a set time period later a second set of primary lights 44 may be illuminated. This may continue to a third set of primary lights 44 being illuminated and so on, which may eventually go back to the original set of primary lights 44 being illuminated. When this sequence of lighting patterns progresses in a controlled manner, the visual outcome may be a moving pattern which may be very eye catching. One example of an animated lighting pattern is shown in FIGS. 14a-14c. Here a star pattern is shown with one line of primary lights 44 illuminated at the twelve o'clock position in FIG. 14a. The next pattern progression is shown in FIG. 14b where the entire star pattern of primary lights 44 is rotated one lighting segment angle clockwise. In FIG. 14c, this star pattern of primary lights 44 is rotated one more lighting segment clockwise. If this pattern sequence would continue, the next step may be for the lighting pattern to replicate the original pattern as shown in FIG. 14a. As such, this rotating star pattern could continue endlessly if desired.

Figure 15A:
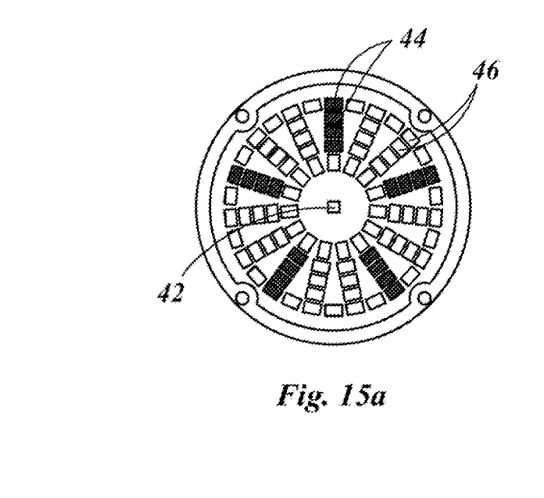
FIG. 15a is a front view of the replaceable light of FIG. 7, shown in a first position of a second dynamic lighting pattern.
Figure 15B:
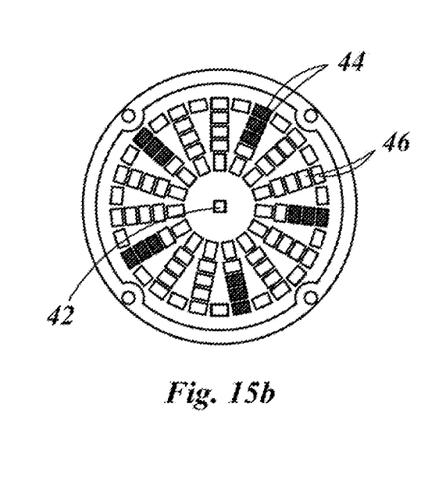
FIG. 15b is a front view of the replaceable light of FIG. 15a, shown in a second position of a second dynamic lighting pattern.
Figure 15C:
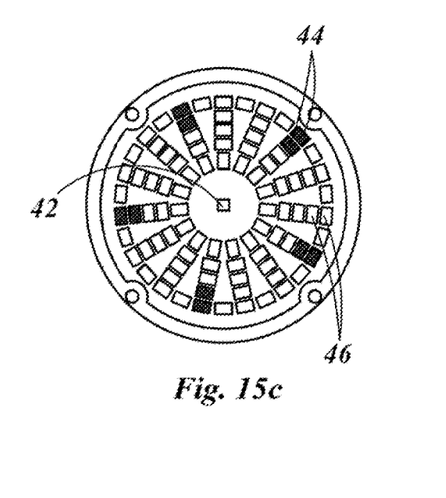
FIG. 15c is a front view of the replaceable light of FIG. 15a, shown in a third position of a second dynamic lighting pattern.

Another lighting pattern animation example is shown in FIGS. 15a-15c. In FIG. 15a, the same star pattern may be displayed as was in FIG. 14a. In FIG. 15b, the star pattern may rotate one lighting segment angle clockwise, but also the segment lengths of primary lights 44 may be reduced by one annular circle of individual lights 40, thereby increasing the ring of secondary lights 46. This double process may progress to a second angular displacement and a second ring of removal of primary lights 44 and therefore addition of secondary lights 46 in FIG. 15c. As before, this process may continue back to the original display of primary lights 44 and secondary lights 46 as in FIG. 15a or it may continue in any number of an infinite number of pattern sequences.

One of the advantages of the radial layout and is even more emphasized by the animation as detailed above and shown in FIGS. 14a-14c and 15a-15c is these may all be visually appealing and therefore more noticeable compared to a solid red brake light or simple flashing turn signal. The greater the ability the replaceable vehicle light 22 is to be noticed, the more likely the vehicle 20 is to be noticed, especially when the vehicle 20 is changing direction (turn signals employed) or slowing down (brake lights employed). The more visible the vehicle 20, the less likely there is to be a vehicular collision. This is especially important when the vehicle 20 is a motorcycle. According to the Insurance Information Institute, the fatality rate of motorcycle riders is almost six times greater than those riding in passenger cars. This emphasizes the need for increased visibility for motorcycles on the roadways. The use of a circular pattern may tend to draw the eye to the center of the radial pattern. Not only does this help to prevent an observer's eye from wandering away from the light, but this may help to distinguish the lights of the replaceable vehicle light 22 from other common construction lights or other vehicle lights. Any ability to make the illumination of the replaceable vehicle lights 22 distinguishable from other roadway lights, makes the vehicle 20 carrying the replaceable vehicle light 22 more likely to be seen and therefore safer.

Figure 16:
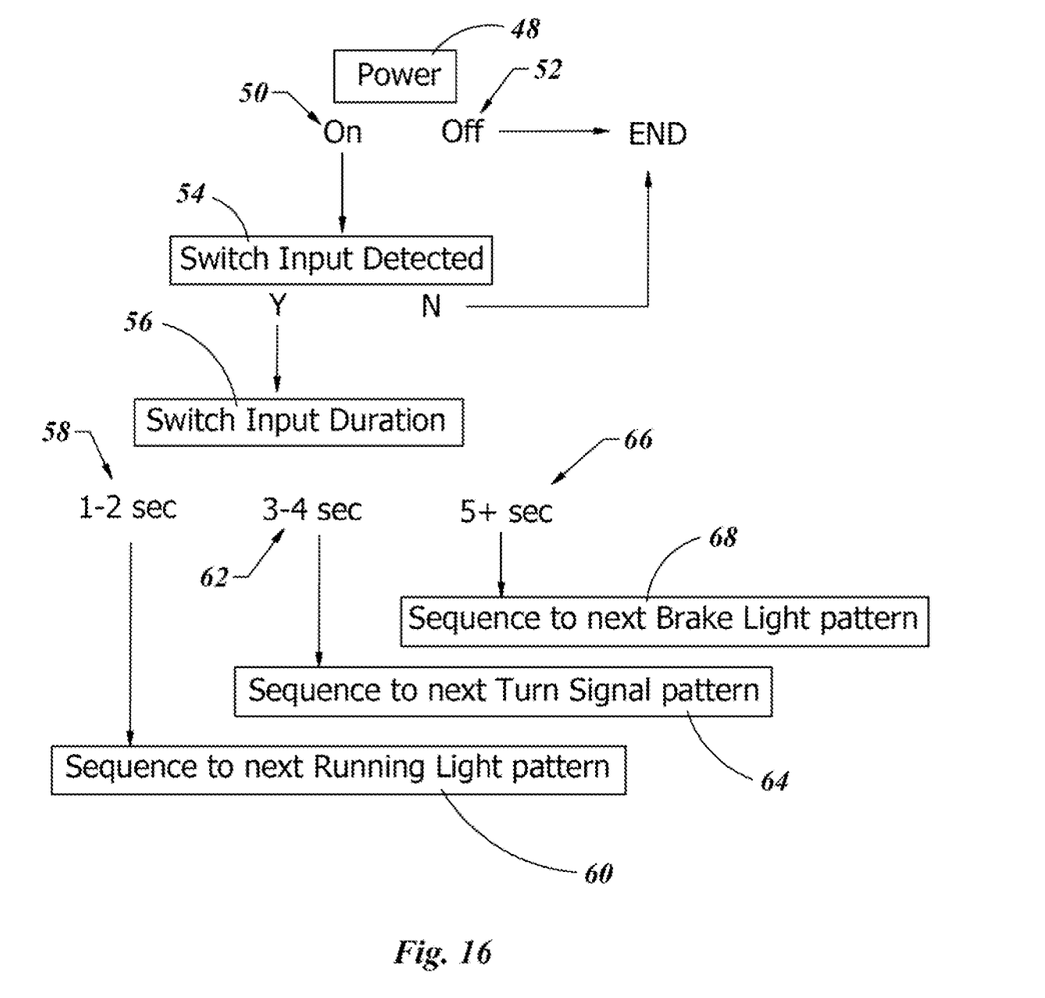
FIG. 16 is a graphic representation of logic sequence of a replaceable vehicle light using a switch to change the lighting pattern category.

As noted, the previous figures give examples of some lighting patterns. With respect to lighting pattern categories, a method of using the switch 42 to change lighting pattern categories is outlined in the flow chart of FIG. 16. Lighting pattern categories may include: brake light patterns, running light patterns and turn signal patterns. In this embodiment, a category (brake lights, running lights and turn signals) may each have multiple patterns within each category. The switch 42 may be used to advance the replaceable vehicle light 22 to the next lighting pattern as stored on the controller chip on the pcb 38 (FIG. 7). In addition, the switch 42 may also be used to advance from one category to the next, as is illustrated in FIG. 16. As the replaceable vehicle light 22 may be used in more than one category, it may be useful to set the lighting pattern in each category for which that replaceable vehicle light 22 is used. For example, a rear light 26 may function as a running light and then as a brake light when the brake is applied and then as a turn signal, when the turn signal is actuated. The user may desire different lighting patterns in accordance with the category the light is functioning as at that time.

In order for the lighting category to be changed, the power 48 to the replaceable vehicle light 22 may be on 50. If the power 48 is off 52, the system may not allow a change. This may be desirable in that the lighting pattern in any category is not changed accidently. A switch input may be detected 54. If a mechanical switch is used, the input may be pressing the switch button. If a magnetic switch is used, the input may be the switch 42 is in the presence of a magnetic field. The category may sequence from one category to another category depending on the duration 56 the switch 42 maintains the input. For example, a 1-2 second duration 58 may default to the running light category 60. If the input to the switch 42 is maintained to 3-4 seconds 62, the category may sequence to the turn signal category 64. If the input to the switch 42 is maintained for 5 seconds or longer 66, the lighting category may sequence to the brake light category 68. While in any of these categories, the individual lighting patterns may sequence through any number of patterns. When the desired pattern is found for that category, the user may remove the input to the switch 42 and that pattern may be stored as the pattern for that category.

The foregoing detailed description of the present invention is provided for purpose of illustration, and it is not intended to be exhaustive or to limit the invention to the particular embodiment shown. The embodiments may provide different capabilities and benefits, depending on the configuration used to implement key features of the invention.

What is claimed is:

1. A replaceable vehicle light comprising:
   a lamp body;
   a printed circuit board supported by the lamp body, the printed circuit board including a plurality of individual lights arranged in a radial pattern;
   a controller chip on the printed circuit board, the controller chip providing electrical energy to each of the individual lights thereby enabling selective illumination of each of the individual lights;
   a plug adapted to be received by a vehicle lamp housing, the plug being in electrical communication with the printed circuit board; and
   a switch on the printed circuit board enabling communication of time-input signals to the controller chip, where a first time-input signal with a first duration signals the controller chip to transition to a lighting-pattern category programmed on the controller chip and a second time-input signal with a second duration signals the controller chip to transition to a different lighting-pattern category, the first duration being different from the second duration.

2. The replaceable vehicle light according to claim 1, wherein the switch is a magnetic switch mounted on the printed circuit board.

3. The replaceable vehicle light according to claim 2, wherein the magnetic switch detects a magnetic field and the controller chip alters the lighting-pattern category based on the duration of the presence of the magnetic field.

4. The replacement vehicle light according to claim 3, wherein the lighting-pattern category is a category from the group consisting of: running light patterns, turn signal patterns and brake light patterns.

5. A replaceable vehicle light comprising:
   a lamp body;
   a printed circuit board supported by the lamp body, the printed circuit board including a plurality of individual lights arranged in a radial pattern;
   a controller chip on the printed circuit board, the controller chip providing electrical energy to each of the individual lights thereby enabling selective illumination of each of the individual lights;
   a plug adapted to be received by a vehicle lamp housing, the plug being in electrical communication with the printed circuit board;
   a plurality of dynamic lighting patterns encoded on the controller chip, such that each one of the plurality of dynamic lighting patterns provides a first pattern of illumination of the individual lights in a first radial pattern and then transitioning to a second pattern of illumination of the individual lights in a second radial pattern, some of the individual lights of the first radial pattern being different from those of the individual lights of the second radial pattern; and
   a switch on the printed circuit board enabling communication of time-input signals to the controller chip, where a first time-input signal with a first duration signals the controller chip to transition the plurality of individual lights to a first one of the plurality of dynamic lighting patterns, and a second time-input signal with a second duration signals the controller chip to transition the plurality of individual lights to a second one of the plurality of dynamic lighting patterns, and the first duration is different from the second duration.

6. The replaceable vehicle light according to claim 5, further comprising a lighting designation by the controller chip, wherein some of the individual lights are designated as primary lights, being illuminated at a first brightness and some individual lights are designated as secondary lights, being illuminated less than the first brightness.

7. The replaceable vehicle light according to claim 6, wherein the primary lights illuminate in a radial pattern and the secondary lights output includes zero light output and another light output less than light output of the primary lights.

8. The replaceable vehicle light according to claim 6, wherein the primary lights illuminate in a light output range including 61% to 100% of a maximum brightness of the individual lights.

9. The replaceable vehicle light according to claim 6, wherein the secondary lights illuminate in a light output range including 0% to 60% of the maximum brightness of the individual lights.

10. The replaceable vehicle light according to claim 6, wherein the secondary lights are all of the individual lights that are not designated as primary lights.

11. The replaceable vehicle light according to claim 6, wherein the replaceable vehicle light is a light selected from the group consisting of: a tail light, a running light and a turn signal.

12. The replaceable vehicle light according to claim 5, wherein the plurality of lights is comprised of a plurality of light emitting diodes.

13. A replaceable vehicle light comprising:
- a lamp body;
- a printed circuit board supported by the lamp body, the printed circuit board including a plurality of individual lights arranged in a radial pattern;
- a controller chip on the printed circuit board, the controller chip providing electrical energy to each of the individual lights, thereby enabling selective illumination of each of the individual lights; the controller chip providing a lighting designation, wherein some of the individual lights are designated as primary lights, being illuminated at a first brightness and some individual lights are designated as secondary lights, being illuminated less than the first brightness;
- a switch on the printed circuit board enabling communication of time-input signals to the controller chip, where a first time-input signal with a first duration signals the controller chip to transition the plurality of individual lights to a first lighting-pattern category and a second time-input signal with a second duration signals the controller chip to transition the plurality of individual lights to a second lighting-pattern category, the first duration being different from the second duration and the first lighting-pattern category being different from the second lighting-pattern category, and
- a plug adapted to be received by a vehicle lamp housing, the plug being in electrical communication with the printed circuit board.

14. The replaceable vehicle light according to claim 13, wherein the plurality of lights is comprised of a plurality of light emitting diodes.

15. The replaceable vehicle light according to claim 14, wherein the light emitting diodes are multi-color light emitting diodes.

16. The replaceable vehicle light according to claim 13, further comprising a plurality of dynamic lighting patterns encoded on the controller chip, such that each one of the plurality of dynamic lighting patterns provides a first pattern of illumination of the individual lights in a first radial pattern and then transitioning to a second pattern of illumination of the individual lights in a second radial pattern, some of the individual lights of the first radial pattern being different from those of the individual lights of the second radial pattern.

17. The replaceable vehicle light according to claim 13, wherein the primary lights illuminate in a radial pattern and the secondary lights output includes zero light output and another light output less than light output of the primary lights.

18. The replaceable vehicle light according to claim 13, wherein the primary lights illuminate in a light output range including 61% to 100% of a maximum brightness of the individual lights.

19. The replaceable vehicle light according to claim 13, wherein the secondary lights illuminate in a light output range including 0% to 60% of the maximum brightness of the individual lights.

20. The replaceable vehicle light according to claim 13, wherein the secondary lights are all of the individual lights that are not designated as primary lights.

* * * * *